US009416499B2

(12) United States Patent
Cronin et al.

(10) Patent No.: US 9,416,499 B2
(45) Date of Patent: Aug. 16, 2016

(54) SYSTEM AND METHOD FOR SENSING AND MANAGING POTHOLE LOCATION AND POTHOLE CHARACTERISTICS

(71) Applicants: John Edward Cronin, Jericho, VT (US); Benjamin Shields Taylor, Williston, VT (US); William Petrow, Charlotte, VT (US); Edward Joseph Limoge, Williston, VT (US); Stephen Douglas Garland, Denver, CO (US)

(72) Inventors: John Edward Cronin, Jericho, VT (US); Benjamin Shields Taylor, Williston, VT (US); William Petrow, Charlotte, VT (US); Edward Joseph Limoge, Williston, VT (US); Stephen Douglas Garland, Denver, CO (US)

(73) Assignee: Heatwurx, Inc., Gardena, CA (US)

( * ) Notice: Subject to any disclaimer, the term of this patent is extended or adjusted under 35 U.S.C. 154(b) by 297 days.

(21) Appl. No.: 13/742,928

(22) Filed: Jan. 16, 2013

(65) Prior Publication Data

US 2014/0196529 A1     Jul. 17, 2014

(51) Int. Cl.
| | |
|---|---|
| *E01C 23/01* | (2006.01) |
| *E01C 23/06* | (2006.01) |
| *G06F 17/40* | (2006.01) |
| *G06F 17/30* | (2006.01) |
| *G06Q 50/26* | (2012.01) |

(52) U.S. Cl.
CPC .............. *E01C 23/01* (2013.01); *E01C 23/06* (2013.01); *G06F 17/30997* (2013.01); *G06Q 50/26* (2013.01)

(58) Field of Classification Search
CPC ........ G01M 17/06; E01C 23/00; E01C 23/01; E01C 23/06; G06F 17/30997; G06F 19/26; G06Q 50/00

USPC .......................... 73/146, 146.2–146.5, 146.8
See application file for complete search history.

(56) References Cited

U.S. PATENT DOCUMENTS

| | | | |
|---|---|---|---|
| 371,288 | A | 10/1887 | Walker |
| 487,652 | A | 12/1892 | Turley |
| 1,628,874 | A | 5/1927 | Eastes |
| 2,088,534 | A | 7/1937 | Pittman |
| 2,134,245 | A | 10/1938 | Carswell |
| 2,397,782 | A | 4/1946 | Flynn |
| 2,832,187 | A | 4/1958 | Johnson |
| 2,924,054 | A | 2/1960 | Myers |
| 3,224,347 | A | 12/1965 | Seaman |
| 3,309,854 | A | 3/1967 | Mitchell et al. |
| 3,375,764 | A | 4/1968 | Petersen |

(Continued)

FOREIGN PATENT DOCUMENTS

| | | |
|---|---|---|
| CA | 999462 | 11/1976 |
| CA | 1061623 | 9/1979 |

(Continued)

OTHER PUBLICATIONS

U.S. Appl. No. 13/777,633, filed Feb. 26, 2013, Garland et al.

(Continued)

*Primary Examiner* — Peter Macchiarolo
*Assistant Examiner* — Anthony W Megna Fuentes
(74) *Attorney, Agent, or Firm* — Sheridan Ross P.C.

(57) ABSTRACT

The present invention provides a system and method for sensing and managing pothole locations and pothole characteristics. An additional aspect of the present invention is to provide a system that may acquire, fuse, and analyze pothole sensing data from several sources to identify potholes in need of maintenance or repair. Further, the system may be configured to create and distribute recurring reports of pothole repair data for use by roadway officials.

19 Claims, 5 Drawing Sheets

(56) References Cited

U.S. PATENT DOCUMENTS

| | | |
|---|---|---|
| 3,405,613 A | 10/1968 | Gustafson |
| 3,564,985 A | 2/1971 | Heller |
| 3,625,489 A | 12/1971 | Weaver |
| 3,732,023 A | 5/1973 | Rank et al. |
| 3,807,886 A | 4/1974 | Cutler |
| 3,820,914 A | 6/1974 | Zimmerman |
| 3,837,886 A | 9/1974 | Tatsuta et al. |
| 3,874,366 A | 4/1975 | Cutler |
| D236,745 S | 9/1975 | Fuentes |
| 3,907,450 A | 9/1975 | Cutler |
| 3,965,281 A | 6/1976 | Takase |
| 3,970,404 A | 7/1976 | Benedetti |
| 3,989,401 A | 11/1976 | Moench |
| 3,997,276 A | 12/1976 | Jackson, Sr. |
| 4,007,995 A | 2/1977 | Rofidal |
| 4,011,023 A | 3/1977 | Cutler |
| 4,018,540 A | 4/1977 | Jackson, Sr. |
| 4,072,435 A | 2/1978 | Coho |
| 4,084,915 A | 4/1978 | Wiseblood |
| 4,124,325 A | 11/1978 | Cutler |
| 4,129,398 A | 12/1978 | Schoelkopf |
| 4,139,318 A | 2/1979 | Jakob |
| 4,172,679 A | 10/1979 | Wirtgen |
| 4,226,552 A | 10/1980 | Moench |
| 4,252,487 A | 2/1981 | Jeppson |
| 4,300,853 A | 11/1981 | Jones |
| 4,315,700 A | 2/1982 | Heiligtag et al. |
| 4,319,856 A | 3/1982 | Jeppson |
| 4,325,580 A | 4/1982 | Swisher, Jr. |
| 4,335,975 A | 6/1982 | Schoelkopf |
| 4,347,016 A | 8/1982 | Sindelar |
| 4,407,605 A | 10/1983 | Wirtgen |
| 4,453,856 A | 6/1984 | Chiostri |
| D277,676 S | 2/1985 | Neal |
| 4,534,674 A | 8/1985 | Cutler |
| 4,544,305 A | 10/1985 | Hair |
| 4,545,700 A | 10/1985 | Yates |
| 4,557,626 A | 12/1985 | McKay |
| 4,561,800 A | 12/1985 | Hatakenaka |
| 4,594,022 A | 6/1986 | Jeppson |
| 4,619,550 A | 10/1986 | Jeppson |
| 4,678,363 A | 7/1987 | Sterner |
| 4,684,288 A | 8/1987 | Chapa |
| 4,711,600 A | 12/1987 | Yates |
| 4,720,207 A | 1/1988 | Salani |
| 4,749,303 A | 6/1988 | Keizer et al. |
| 4,780,022 A | 10/1988 | Ohiba |
| 4,793,730 A | 12/1988 | Butch |
| 4,793,732 A | 12/1988 | Jordon |
| 4,849,020 A | 7/1989 | Osborne |
| 4,929,120 A | 5/1990 | Wiley et al. |
| 4,938,537 A | 7/1990 | Rife, Jr. et al. |
| 4,969,772 A | 11/1990 | Chiba |
| 4,969,773 A | 11/1990 | Heims |
| 4,969,774 A | 11/1990 | Arseneault et al. |
| 5,002,426 A | 3/1991 | Brown et al. |
| 5,026,206 A | 6/1991 | O'Connor |
| 5,042,973 A | 8/1991 | Hammarstrand |
| 5,078,540 A | 1/1992 | Jakob et al. |
| 5,092,706 A | 3/1992 | Bowen et al. |
| 5,114,284 A | 5/1992 | Keizer et al. |
| 5,131,788 A | 7/1992 | Hulicsko |
| 5,148,799 A | 9/1992 | St-Louis |
| 5,188,481 A | 2/1993 | O'Brien |
| 5,251,999 A | 10/1993 | McCracken |
| 5,263,769 A | 11/1993 | Pharr et al. |
| 5,309,702 A | 5/1994 | Lundahl et al. |
| 5,333,969 A | 8/1994 | Blaha et al. |
| 5,352,275 A | 10/1994 | Nath et al. |
| 5,378,079 A | 1/1995 | Omann |
| 5,385,426 A | 1/1995 | Omann |
| 5,388,893 A | 2/1995 | Maxwell et al. |
| D357,483 S | 4/1995 | Ramsey et al. |
| 5,403,117 A | 4/1995 | Okuyama et al. |
| 5,405,213 A | 4/1995 | O'Connor |
| 5,419,654 A | 5/1995 | Kleiger |
| 5,439,313 A | 8/1995 | Blaha |
| 5,472,292 A | 12/1995 | Wiley |
| 5,484,224 A | 1/1996 | Lynch |
| 5,549,412 A | 8/1996 | Malone |
| 5,556,225 A | 9/1996 | Marino |
| 5,584,597 A | 12/1996 | Lemelson |
| 5,592,760 A | 1/1997 | Kohout |
| 5,599,133 A | 2/1997 | Costello et al. |
| 5,607,022 A | 3/1997 | Walker et al. |
| 5,618,132 A | 4/1997 | Fogg et al. |
| 5,630,677 A | 5/1997 | Barroso |
| 5,653,552 A | 8/1997 | Wiley et al. |
| 5,722,789 A | 3/1998 | Murray et al. |
| 5,749,674 A | 5/1998 | Wilson, Sr. |
| 5,752,782 A | 5/1998 | Hulicsko |
| 5,755,865 A | 5/1998 | Lukens |
| 5,766,333 A | 6/1998 | Lukens |
| 5,775,438 A | 7/1998 | Confoey et al. |
| 5,791,814 A | 8/1998 | Wiley |
| 5,795,096 A | 8/1998 | Culver |
| 5,810,471 A | 9/1998 | Nath et al. |
| 5,827,008 A | 10/1998 | Smith et al. |
| 5,829,235 A | 11/1998 | Rice et al. |
| 5,848,755 A | 12/1998 | Zickell et al. |
| 5,895,171 A | 4/1999 | Wiley et al. |
| 5,899,630 A | 5/1999 | Brock |
| 5,921,708 A | 7/1999 | Grundl et al. |
| 5,928,746 A | 7/1999 | Dalton et al. |
| 5,938,130 A | 8/1999 | Zickell |
| 5,947,634 A | 9/1999 | Robillard |
| 5,947,636 A * | 9/1999 | Mara .................... 404/84.05 |
| 5,950,169 A | 9/1999 | Borghesi et al. |
| 5,967,695 A | 10/1999 | Vural |
| 5,988,935 A | 11/1999 | Dillingham |
| 5,997,724 A | 12/1999 | Lukens |
| 6,000,205 A | 12/1999 | Joray |
| 6,049,658 A | 4/2000 | Schave et al. |
| 6,074,128 A | 6/2000 | Marino |
| 6,117,227 A | 9/2000 | Kitagawa |
| 6,135,567 A | 10/2000 | Cochran |
| 6,139,612 A | 10/2000 | Kitagawa et al. |
| 6,186,700 B1 | 2/2001 | Omann |
| 6,213,559 B1 | 4/2001 | Stevens |
| 6,214,103 B1 | 4/2001 | Kitagawa |
| 6,220,782 B1 | 4/2001 | Yates |
| 6,227,620 B1 | 5/2001 | Page |
| 6,227,762 B1 | 5/2001 | Van Velsor |
| 6,290,152 B1 | 9/2001 | Zickell |
| 6,318,928 B1 | 11/2001 | Swearingen |
| 6,371,689 B1 | 4/2002 | Wiley |
| 6,382,871 B1 | 5/2002 | Ross |
| 6,394,696 B1 | 5/2002 | Culver |
| 6,398,453 B1 | 6/2002 | Stegemoeller |
| 6,416,249 B1 | 7/2002 | Crupi |
| 6,422,784 B1 | 7/2002 | Pellegrino et al. |
| 6,439,804 B1 | 8/2002 | Crupi |
| 6,439,806 B1 | 8/2002 | Dillingham |
| 6,497,930 B1 | 12/2002 | Petermeier |
| 6,551,017 B1 | 4/2003 | Strassman |
| 6,584,414 B1 | 6/2003 | Green et al. |
| 6,588,973 B1 | 7/2003 | Omann |
| 6,599,057 B2 | 7/2003 | Thomas et al. |
| 6,626,499 B1 | 9/2003 | Schenk et al. |
| 6,659,684 B1 | 12/2003 | Goodhart et al. |
| 6,669,467 B2 | 12/2003 | Kieswetter |
| 6,681,761 B2 | 1/2004 | Dillingham |
| 6,682,261 B1 | 1/2004 | Karamihas et al. |
| 6,685,465 B2 | 2/2004 | Marquardt |
| 6,695,530 B2 | 2/2004 | Crupi |
| 6,764,542 B1 | 7/2004 | Lackey et al. |
| 6,769,836 B2 | 8/2004 | Lloyd |
| 6,802,897 B1 | 10/2004 | Lackey et al. |
| 6,805,738 B2 | 10/2004 | Tasaki |
| 6,821,052 B2 | 11/2004 | Zurn |
| 6,872,072 B2 | 3/2005 | Kieswetter |
| 6,892,204 B2 * | 5/2005 | Haas et al. .................... 701/532 |
| 6,899,839 B2 | 5/2005 | Fifield |
| 6,939,079 B2 | 9/2005 | Lloyd |

(56) References Cited

U.S. PATENT DOCUMENTS

| | | |
|---|---|---|
| 6,947,636 B2 | 9/2005 | Shinozaki et al. |
| 6,988,849 B1 * | 1/2006 | Zimmerman .................... 404/95 |
| 6,998,010 B2 | 2/2006 | Wiley |
| 7,003,443 B2 | 2/2006 | Ford et al. |
| 7,004,675 B2 | 2/2006 | Wayne |
| 7,008,670 B1 | 3/2006 | Freisthler |
| 7,037,036 B2 | 5/2006 | Strassman |
| 7,037,955 B2 | 5/2006 | Timcik et al. |
| 7,070,244 B2 | 7/2006 | Fischer et al. |
| 7,077,601 B2 | 7/2006 | Lloyd |
| 7,104,724 B2 | 9/2006 | Terry |
| 7,134,806 B2 | 11/2006 | Lazic |
| 7,140,693 B2 | 11/2006 | Dubay et al. |
| 7,150,420 B2 | 12/2006 | Packer et al. |
| 7,152,820 B1 | 12/2006 | Baker et al. |
| 7,179,018 B2 | 2/2007 | Hall et al. |
| 7,201,536 B2 | 4/2007 | Westbrook et al. |
| 7,252,455 B2 | 8/2007 | Larsen |
| 7,275,890 B2 | 10/2007 | Thomas et al. |
| 7,287,818 B1 | 10/2007 | Hall et al. |
| 7,297,720 B2 | 11/2007 | Meyers et al. |
| 7,387,464 B2 | 6/2008 | Hall et al. |
| 7,387,465 B2 | 6/2008 | Hall et al. |
| 7,396,085 B2 | 7/2008 | Hall et al. |
| 7,413,375 B2 | 8/2008 | Hall |
| 7,413,376 B2 | 8/2008 | Potts et al. |
| 7,421,334 B2 * | 9/2008 | Dahlgren et al. ............. 701/117 |
| 7,448,825 B2 | 11/2008 | Kasahara |
| 7,455,476 B2 | 11/2008 | Grubba et al. |
| 7,458,746 B1 | 12/2008 | Zimmerman |
| 7,470,082 B2 | 12/2008 | Lloyd |
| 7,473,052 B2 | 1/2009 | Hall et al. |
| 7,481,601 B2 | 1/2009 | Gilchrist |
| 7,503,202 B1 | 3/2009 | Kadrmas |
| 7,544,011 B2 | 6/2009 | Hall et al. |
| 7,544,253 B2 | 6/2009 | Kleiger et al. |
| 7,546,765 B1 | 6/2009 | Janke et al. |
| 7,549,821 B2 | 6/2009 | Hall et al. |
| 7,562,563 B2 | 7/2009 | Wee |
| 7,571,029 B2 | 8/2009 | Dai et al. |
| 7,578,634 B2 | 8/2009 | Velsor |
| 7,585,128 B2 | 9/2009 | Hall et al. |
| 7,588,388 B2 | 9/2009 | Hall et al. |
| 7,591,607 B2 | 9/2009 | Hall et al. |
| 7,591,608 B2 | 9/2009 | Hall et al. |
| 7,641,418 B2 | 1/2010 | Hall et al. |
| 7,654,772 B1 | 2/2010 | Zimmerman |
| 7,686,536 B2 | 3/2010 | Hall et al. |
| 7,717,521 B2 | 5/2010 | Hall et al. |
| 7,726,905 B2 | 6/2010 | Hall et al. |
| 7,740,414 B2 | 6/2010 | Hall et al. |
| 7,748,789 B2 | 7/2010 | Freeburn |
| 7,780,373 B2 | 8/2010 | Ustyugov |
| 7,798,745 B2 | 9/2010 | Hall et al. |
| 7,819,607 B2 | 10/2010 | Carreras-Maldonado et al. |
| 7,845,878 B1 | 12/2010 | Godbersen et al. |
| 7,887,142 B2 | 2/2011 | Hall et al. |
| 7,909,532 B2 | 3/2011 | Johnson et al. |
| 7,927,413 B2 | 4/2011 | Brock et al. |
| 7,980,278 B2 | 7/2011 | Labbe et al. |
| 8,016,514 B2 | 9/2011 | Broadway, III |
| 8,016,515 B2 | 9/2011 | Benedetti et al. |
| 8,061,782 B2 | 11/2011 | Hall et al. |
| 8,079,777 B2 | 12/2011 | Van Velsor |
| 8,083,434 B1 | 12/2011 | Gorman et al. |
| 8,088,210 B2 | 1/2012 | Crews et al. |
| 8,095,306 B2 | 1/2012 | Villalobos et al. |
| 8,267,619 B2 | 9/2012 | Munz |
| 8,280,634 B2 | 10/2012 | Young et al. |
| 8,403,594 B2 | 3/2013 | Neumann |
| 8,465,225 B2 | 6/2013 | Groulx et al. |
| 2002/0154029 A1 | 10/2002 | Watters et al. |
| 2003/0002922 A1 | 1/2003 | Boyer et al. |
| 2003/0026656 A1 | 2/2003 | Crupi |
| 2003/0044522 A1 | 3/2003 | Isozaki |
| 2003/0126809 A1 | 7/2003 | Hampton |
| 2004/0099654 A1 | 5/2004 | Pais |
| 2004/0116557 A1 | 6/2004 | Pounds et al. |
| 2004/0160595 A1 | 8/2004 | Zivkovic et al. |
| 2004/0240939 A1 | 12/2004 | Hays et al. |
| 2005/0149561 A1 | 7/2005 | Hodnett et al. |
| 2006/0039756 A1 | 2/2006 | Lemke et al. |
| 2006/0099031 A1 | 5/2006 | Rathe |
| 2006/0104716 A1 | 5/2006 | Jones |
| 2006/0196698 A1 | 9/2006 | Hall et al. |
| 2006/0204332 A1 | 9/2006 | Boudreau |
| 2006/0243463 A1 | 11/2006 | Mensch |
| 2006/0285923 A1 | 12/2006 | Musil et al. |
| 2007/0087756 A1 * | 4/2007 | Hoffberg ...................... 455/450 |
| 2007/0116519 A1 | 5/2007 | Haroldsen |
| 2007/0172313 A1 | 7/2007 | Lopez |
| 2007/0220781 A1 | 9/2007 | Altizer et al. |
| 2007/0240700 A1 | 10/2007 | Bucklew |
| 2007/0257781 A1 * | 11/2007 | Denson ...................... 340/425.5 |
| 2007/0258766 A1 | 11/2007 | Mugge |
| 2008/0008525 A1 | 1/2008 | Dawson et al. |
| 2008/0056820 A1 | 3/2008 | Hall et al. |
| 2008/0082347 A1 | 4/2008 | Villalobos et al. |
| 2008/0152427 A1 | 6/2008 | Gillard et al. |
| 2008/0221785 A1 | 9/2008 | Winberry et al. |
| 2008/0226392 A1 | 9/2008 | Lloyd |
| 2008/0247823 A1 | 10/2008 | Will et al. |
| 2008/0249729 A1 | 10/2008 | Martinez et al. |
| 2008/0292401 A1 | 11/2008 | Potts |
| 2009/0030910 A1 | 1/2009 | Bennett et al. |
| 2009/0052988 A1 | 2/2009 | Belley |
| 2009/0116905 A1 | 5/2009 | McDonald |
| 2009/0136295 A1 | 5/2009 | Boyd |
| 2009/0185859 A1 | 7/2009 | Haroldsen |
| 2009/0226254 A1 | 9/2009 | Jones |
| 2009/0297268 A1 | 12/2009 | Harakawa et al. |
| 2010/0021233 A1 | 1/2010 | Chandler |
| 2010/0034586 A1 | 2/2010 | Bailey et al. |
| 2010/0055304 A1 | 3/2010 | Reinke et al. |
| 2010/0104363 A1 | 4/2010 | Benedetti |
| 2010/0115908 A1 | 5/2010 | Trevillyan et al. |
| 2010/0189498 A1 | 7/2010 | Doherty et al. |
| 2010/0203462 A1 | 8/2010 | Gencer |
| 2010/0209188 A1 | 8/2010 | Wiley |
| 2010/0310312 A1 | 12/2010 | Mahler |
| 2010/0313638 A1 | 12/2010 | Handschuck et al. |
| 2010/0316445 A1 | 12/2010 | Kasahara et al. |
| 2010/0322710 A1 | 12/2010 | Ryan |
| 2010/0322713 A1 | 12/2010 | Hegg |
| 2011/0042982 A1 | 2/2011 | Coutu |
| 2011/0070024 A1 | 3/2011 | Kleiger |
| 2011/0070025 A1 | 3/2011 | Kleiger |
| 2011/0085860 A1 | 4/2011 | Gregerson |
| 2011/0091275 A1 | 4/2011 | Lindenbaum |
| 2011/0120443 A1 | 5/2011 | Stothert et al. |
| 2011/0163589 A1 | 7/2011 | Cipriani et al. |
| 2011/0173039 A1 * | 7/2011 | Villalobos et al. ........... 705/7.12 |
| 2011/0250016 A1 | 10/2011 | Giles |
| 2011/0274487 A1 | 11/2011 | Sylvester |
| 2011/0298188 A1 | 12/2011 | Haubrich et al. |
| 2012/0027513 A1 | 2/2012 | Wang |
| 2012/0253612 A1 | 10/2012 | Byrne |
| 2012/0311943 A1 | 12/2012 | Gran et al. |
| 2013/0089372 A1 | 4/2013 | Ciccarello |
| 2013/0136539 A1 | 5/2013 | Aardema |
| 2013/0223931 A1 | 8/2013 | Hegg |
| 2014/0157691 A1 | 6/2014 | Putnam |
| 2015/0284916 A1 | 10/2015 | Dworsky |

FOREIGN PATENT DOCUMENTS

| | | |
|---|---|---|
| CA | 1063410 | 10/1979 |
| CA | 1065843 | 11/1979 |
| CA | 1081516 | 7/1980 |
| CA | 1093365 | 1/1981 |
| CA | 1134344 | 10/1982 |
| CA | 1169318 | 6/1984 |
| CA | 1214673 | 12/1986 |
| CA | 1225857 | 8/1987 |

(56) References Cited

FOREIGN PATENT DOCUMENTS

| | | |
|---|---|---|
| CA | 1226159 | 9/1987 |
| CA | 1235935 | 5/1988 |
| CA | 1237315 | 5/1988 |
| CA | 2002058 | 5/1991 |
| CA | 1300417 | 5/1992 |
| CA | 1304251 | 6/1992 |
| CA | 2087879 | 7/1993 |
| CA | 1328334 | 4/1994 |
| CA | 2021648 | 8/1998 |
| CA | 2061682 | 3/1999 |
| CA | 2251284 | 3/1999 |
| CA | 2366009 | 9/2000 |
| CA | 2287547 | 4/2001 |
| CA | 2428367 | 5/2002 |
| CA | 2334297 | 8/2002 |
| CA | 2131429 | 11/2003 |
| CA | 2409493 | 4/2004 |
| CA | 2647593 | 10/2007 |
| CA | 2705374 | 5/2009 |
| CA | 2252250 | 7/2009 |
| CA | 2575074 | 9/2009 |
| CA | 2721990 | 5/2011 |
| EP | 560021 | 9/1996 |
| EP | 810276 | 12/1997 |
| EP | 985768 | 3/2000 |
| EP | 854235 | 3/2005 |
| EP | 1052334 | 3/2005 |
| EP | 1668185 | 6/2006 |
| EP | 1337711 | 10/2007 |
| EP | 2111436 | 10/2009 |
| EP | 2213799 | 8/2010 |
| EP | 2050875 | 6/2011 |
| EP | 2350390 | 8/2011 |
| EP | 2350391 | 8/2011 |
| EP | 2374934 | 10/2011 |
| WO | WO 99/41456 | 8/1999 |
| WO | WO 00/12820 | 3/2000 |
| WO | WO 00/15910 | 3/2000 |
| WO | WO 01/81894 | 11/2001 |
| WO | WO 02/14610 | 2/2002 |
| WO | WO 03/050359 | 6/2003 |
| WO | WO 2006/003466 | 1/2006 |
| WO | WO 2006/008187 | 1/2006 |
| WO | WO 2007/000102 | 1/2007 |
| WO | WO 2007/145576 | 2/2008 |
| WO | WO 2008/068877 | 6/2008 |
| WO | WO 2010/031530 | 3/2010 |
| WO | WO 2010/100401 | 9/2010 |
| WO | WO 2010/130143 | 11/2010 |
| WO | WO 2010/121579 | 12/2010 |
| WO | WO 2011/034731 | 3/2011 |
| WO | WO 2011/069191 | 6/2011 |
| WO | WO 2011/086722 | 7/2011 |

OTHER PUBLICATIONS

U.S. Appl. No. 13/848,455, filed Mar. 21, 2013, Giles.
Official Action for U.S. Appl. No. 12/651,358, mailed May 16, 2013 12 pages.
International Search Report and Written Opinion for International (PCT) Patent Application No. PCT/US14/11503 mailed Apr. 29, 2014, 10 pages.
Notice of Allowance for U.S. Appl. No. 13/777,633 mailed Apr. 2, 2014, 6 pages.
U.S. Appl. No. 14/456,285, filed Aug. 11, 2014, Garland et al.
International Search Report and Written Opinion for International (PCT) Patent Application No. PCT/US14/18152, mailed Jun. 17, 2014 11 pages.
Notice of Allowance for U.S. Appl. No. 14/456,285, mailed Sep. 8, 2014 8 pages.
Official Action for U.S. Appl. No. 13/931,076, mailed Sep. 17, 2014 11 pages.
Notice of Allowance for U.S. Appl. No. 13/167,888, mailed Aug. 22, 2013 9 pages.
Notice of Allowance for U.S. Appl. No. 13/848,455, mailed Aug. 20, 2013 7 pages.
U.S. Appl. No. 13/931,076, Jun. 28, 2013, Garland et al.
U.S. Appl. No. 12/651,358, filed Dec. 31, 2009, Giles.
"About MicroPAVER™," Oct. 2011 [retrieved on Oct. 17, 2012]. Retrieved from: www.cecer.army.mil/paver/Index.htm.
"Asphalt Processor" HEATWURX™, Heatwurx.com, date unknown, 1 page.
"Cogo ITS Suite for Android," Halo Tech, no date, [retrieved on Apr. 25, 2013], 2 pages. Retrieved from: http://www.appszoom.com/android_applications/productivity/cogo-its-suite_sxnf.html?nav=related.
"Fill That Hole for iPhone," CTC, no date, [retrieved on Apr. 25, 2013], 2 pages. Retrieved from: https://itunes.apple.com/gb/app/fill-that-hole/id387883097?mt=8.
"Military Radar Technology to Be Used to Detect Potholes in Louisiana," Associated Press, Jan. 2, 2012, 2 pages. Retrieved from: www.foxnews.com/us/2012/01/02/military-radar-technology-to-be-used-to-detect-potholes-in-louisiana/#ixzz2RVUkU6YO.
"PaveMyDrive2012: Voice-driven system for road issues' notifications," no date, [retrieved on Apr. 25, 2013], 2 pages. Retrieved from: https://sites.google.com/site/pavemydrive2012/home.
"Pothole Agent for Android," GITS Android Team, no date, [retrieved on Apr. 25, 2013], 2 pages. Retrieved from: http://www.appszoom.com/android_applications/tools/pothole-agent_isud.html.
"Pothole Alert 311 for Android," Cab Match LLC, no date, [retrieved on Apr. 25, 2013], 2 pages. Retrieved from: www.androidzoom.com/android_applications/tools/pothole-alert-311_njce.html.
"Pothole Alert for Android," Wobdu UG, no date, [retrieved on Apr. 25, 2013], 2 pages. Retrieved from: www.appszoom.com/android_applications/transportation/pothole-alert_bever.html.
"Pothole Radar for iPhone," Wonderant, no date, [retrieved on Apr. 25, 2013], 2 pages. Retrieved from: https://itunes.apple.com/us/app/pothole-radar/id479916387?mt=8.
"Pothole Scout: National pothole tracking iPhone App & Website," no date, [retrieved on Apr. 25, 2013], 1 page. Retrieved from: www.potholescout.com/.
"Pothole Season for iPhone," TAXI Canada Ltd., no date, [retrieved on Apr. 25, 2013], 2 pages. Retrieved from: https://itunes.apple.com/us/app/pothole-season/id501778906?mt=8.
"Pothole Sniffer for Android," Nithin Tumma, no date, [retrieved on Apr. 25, 2013], 2 pages. Retrieved from: http://www.appszoom.com/android_applications/tools/pothole-sniffer_bfgin.html.
"Rehab Oil Rejuvanator" HEATWURX™, Heatwurx.com, date unkown, 1 page.
"RH Series Self Powered Cold Planer" ZANETIS Power Attachments, date unknown, 2 pages.
"Seamless Asphalt Repair" HEATWURX™, Heatwurx.com, date unknown, 4 pages.
"Street Bump for iPhone," City of Boston, no date, [retrieved on Apr. 25, 2013], 2 pages. Retrieved from: https://itunes.apple.com/us/app/street-bump/id528964742?mt=8.
"The Pothole Report for Android," Zeroguru, no date, [retrieved on Apr. 25, 2013], 2 pages. Retrieved from: http://www.appszoom.com/android_applications/transportation/the-pothole-report_beqyc.html.
Angelini et al., "Mapping City Potholes," submitted in partial fulfillment of the requirements of the Degree of Bachelor of Science of Electrical and Computer Engineering, Worcester Polytechnic Institute, 2006, 90 pages.
Anoosh et al., "Pothole Detection—Project Report," Indian Institute of Technology Madras, 2009-2010, 20 pages.
Eriksson et al., "The Pothole Patrol: Using a Mobile Sensor Network for Road Surface Monitoring," Proceedings ofr the 6th International Conference on Mobile Systems, Application, and Services, Jun. 17-20, 2008, 11 pages.
Koch et al., "Improving Pothole Recognition through Vision Tracking for Automated Pavement Assessment," Proceedings of the 18th International EG-ICE Workshop on Intelligent Computing in Engineering, 2011, 8 pages.
Rode et al., "Pothole Detection and Warning System using Wireless Sensor Networks," 2008, 3 pages.

(56) References Cited

OTHER PUBLICATIONS

Rode, "A Pothole Detection System," Dissertation submitted in partial fulfillment of the requirements for the degree of Master of Technology, Indian Institute of Technology, 2008, 69 pages.

Sharma, "Drive safely armed with pothole sensor helmet," Aug. 31, 2006, 5 pages. Retrieved from: www.gizmowatch.com/entry/drive-safely-armed-with-pothole-sensor-helmet/.

Vijay, "Low Cost—FPGA based system for pothole detection on Indian Roads," submitted in partial fulfillment of the requirements for the degree of Master of Technology, Indian Institute of Technology, Jun. 2006, 21 pages.

Official Action for U.S. Appl. No. 12/651,358, mailed Sep. 13, 2011, 7 pages.

Official Action for U.S. Appl. No. 12/651,358, mailed Oct. 24, 2011 10 pages.

Official Action for U.S. Appl. No. 12/651,358, mailed Jun. 4, 2012 13 pages.

Official Action for U.S. Appl. No. 13/167,888, mailed Sep. 7, 2012 6 pages.

Official Action for U.S. Appl. No. 13/167,888, mailed Dec. 4, 2012 8 pages.

Notice of Allowance for U.S. Appl. No. 14/049,682, mailed Dec. 18, 2013 11 pages.

Official Action for U.S. Appl. No. 13/777,633, mailed Dec. 20, 2013, 9 pages.

U.S. Appl. No. 29/461,750, Jul. 26, 2013, Giles.

U.S. Appl. No. 14/049,682, Oct. 9, 2013, Giles.

Notice of Allowance for U.S. Appl. No. 29/461,750, mailed Oct. 28, 2013, 12 pages.

Notice of Allowance for U.S. Appl. No. 14/456,285, mailed Nov. 7, 2014 11 pages.

Official Action for U.S. Appl. No. 13/931,076, mailed Apr. 6, 2015 10 pages.

* cited by examiner

SYSTEM AND METHOD FOR SENSING AND MANAGING POTHOLE LOCATION AND POTHOLE CHARACTERISTICS

CROSS REFERENCE TO RELATED APPLICATIONS

This application cross-references U.S. patent application Ser. No. 12/651,358 filed Dec. 31, 2009 entitled "Infrared Heating System and Method for Heating Surfaces" and U.S. patent application Ser. No. 13/167,888 filed Jun. 24, 2011 entitled "Asphalt Repair System and Method," the disclosures of each of which are incorporated herein by reference in their entirety.

FIELD OF THE INVENTION

Embodiments of the present invention are generally related to roadway maintenance and repair, and, in particular, to a system and method for sensing and managing pothole locations and pothole characteristics.

BACKGROUND OF THE INVENTION

Potholes are a ubiquitous problem that impose financial obligations on roadway authorities and present annoyances, if not costly hazards, to motorists. Furthermore, potholes are a recurring problem creating inevitable damage to roadway surfaces from traffic, construction, and the environment. Asphalt surfaces, such as roads, driveways and parking lots, may suffer damage through a combination of infiltrating water and the continuous flow of moving vehicles. The enormous number of paved roads makes it difficult for federal, state, and local municipalities to identify potholes and to manage repairs. Additionally, an inability to accurately identify potholes, unstable budgets and aggressive cost constraints of public works departments make pothole repair unreliable. Further, the potholes present expensive hazards to motorists. The American Automobile Association has estimated automobile owners spend $4.8 billion annually for repairs caused by potholes. Vehicle damage is one of many types, to include tire damage, premature wear of vehicle sub-assemblies such as shocks and struts, rim and hub damage, steering misalignment, exhaust system damage, and engine damage such as to the oil pan and mounts. In some situations, the damage renders the vehicle immobile, and in extreme circumstances, causes property damage or even severe accidents.

Conventionally, pothole identification and repair is done in an ad hoc manner. This creates an inefficient and routinely ineffective pothole management scheme. For example, a pothole is traditionally identified and located by an angry motorist report or by a road inspector. One inherent problem with both is visual inspection. The motorist reports will always be more prevalent on more frequently-traveled roads. The inspector's knowledge of the pothole location is dependent on their inspection schedule. Roads subject to increased or heavier traffic (e.g., truck traffic) are scheduled for more frequent inspections. Furthermore, when a pothole is identified, it is traditionally unpredictably categorized. For example, a motorist's pothole categorization may be determined by the degree he feels threatened by the pothole, while a roadway inspector may simple categorize potholes as either in need of repair or not in need of repair. More detailed and uniform characterization of potholes will assist with pothole recognition and repair. For example, difficulties in repair are encountered when a pothole is located on the edge of a road or on a bridge deck. Also, a change in substrate or in general material conditions may determine the type of repair.

Some efforts have been made to improve the process of roadway hazard identification. For example, U.S. Pat. No. 7,571,029 to Dai et al ("Dai") discloses an on-vehicle system for identifying and reporting roadway conditions. The system has an operator-selectable user interface to identify occurrence of an external roadway condition, a global positioning system receiver and a wireless communications system. Reportable hazards include potholes, obstacles or debris in the highway, snow or ice patches, fog, unusual traffic or pedestrian activity, and localized incidences, such as presence of disabled or emergency vehicles. A GPS receiver is incorporated to estimate position, speed, and heading of the hazard. The information is encoded as a message sent to a central server. However, Dai fails to teach several novel features of the present invention, including categorizing potholes, directing data sources to acquire pothole identification data and generating reports useful for repair of the pothole. Dai is incorporated herein by reference in its entirety.

Some work has been conducted to map potholes, such as that at Worcester Polytechnic Institute by Angelini et al. ("Angelini"). Angelini discloses a data collection system installed in automotive vehicles to monitor road or highway pavement conditions. The system is based on recording and analyzing the output from an accelerometer mounted near a front wheel shock absorber. The data from the accelerometer is time and position tagged with GPS data and stored on a computer. Geographical Information System (GIS) software is then used to remap the vehicle-acquired data to create a user viewable city map. The data-acquiring vehicles are intended to be city vehicles tasked to roam about a city to map potholes. Angelini, however, fails to teach several novel features of the present invention, including fusing pothole identification data obtained from disparate sources, directing data sources to acquire pothole identification data, and generating reports useful for repair of potholes. Angelini is incorporated herein by reference in its entirety.

Thus, there is a long-felt need for a system and method for sensing and managing pothole location and pothole characteristics, as provided in the present invention. An additional aspect of the present invention is to provide a system that may acquire, fuse, and analyze pothole sensing data from several sources to identify potholes in need of maintenance or repair. Further, the system may be configured to create and distribute recurring reports of pothole repair data for use by roadway officials. The system and method provides several benefits, to include enabling a higher density of repair efforts with a more cost effective utilization of material, labor, and equipment. Less-frequently traveled roads, such as local or tertiary roads, will be able to have pothole locations identified as easily as the more traveled roads, such as secondary or collector roads and primary or arterial roads. Another objective of the information is to collect, organize and catalog pothole information in a central location for immediate and easy access. Additional information about the potholes, such as pothole population and severity, may be included to allow individual entities to coordinate efforts to more efficiently schedule pothole repair.

SUMMARY OF THE INVENTION

It is one aspect of the present invention to provide a system and method for sensing and managing pothole location and pothole characteristics. An additional aspect of the present invention is to provide a system that may acquire, fuse, and analyze pothole sensing data from several sources to identify potholes in need of maintenance or repair. Further, the system may be configured to create and distribute recurring reports of pothole repair data for use by roadway officials.

In one aspect of the invention, a system for monitoring and identifying road damage is provided, the system comprising: a data acquisition module adapted to receive and request data from one or more data sources, the one or more data sources providing at least a location of a roadway anomaly; a database adapted to receive data from the data acquisition module and to store one or more roadway anomalies with respect to a roadway map; a user interface adapted to receive a user query involving one or more roadway anomalies with respect to the roadway map, the user interface in communication with at least one of the data acquisition module and a data analysis module; a data analysis module in communication with the database, the data analysis module adapted to receive and to respond to the user query; and a report generation module adapted to create a report with respect to the user query.

In another aspect of the invention, a method to identify one or more potholes is provided, the method comprising: receiving data from one or more data sources, the one or more data sources providing at least a location of a pothole; receiving roadway map data from a geographic information system; receiving a user query involving one or more potholes with respect to the roadway map; correlating the one or more potholes with respect to the roadway map to at least locate the one or more potholes with respect to the roadway map; and displaying a result of the correlation between the potholes with respect to the roadway map.

In a further aspect of the invention, a method of providing a pothole report to a subscriber is provided, the method comprising: presenting a listing of pothole data types that may be provided to a subscriber; negotiating a set of terms and conditions to provide a subscriber-selected set of the pothole data types to the subscriber; creating the subscriber-selected set of pothole data types to the subscriber according to the negotiated set of terms and conditions; and providing the subscriber-selected set of pothole data types to the subscriber.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine", "calculate" and "compute," and variations thereof, as used herein, are used interchangeably and include any type of methodology, process, mathematical operation or technique.

The term "roadway" as used herein refers to roads of all capacity, whether private or public, of various pavement compositions to include concrete, asphalt, asphalt concrete, and reclaimed asphalt pavement.

The term "roadway anomaly" as used herein refers to any atypical or degraded characteristic of a prototypical roadway, to include potholes, ruts, crowns, upheaval, raveling, shoving, stripping, grade depressions, and cracking of various types to include line cracking and alligator cracking.

The term "module" as used herein refers to any known or later developed hardware, software, firmware, artificial intelligence, fuzzy logic, or combination of hardware and software that is capable of performing the functionality associated with that element.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

This Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention, and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description of the Invention, the drawing figures, and the exemplary claim set forth herein, taken in conjunction with this Summary of the Invention, define the invention.

BRIEF DESCRIPTION OF THE DRAWINGS

The accompanying drawings, which are incorporated in and constitute a part of the specification, illustrate embodiments of the invention and together with the general description of the invention given above, and the detailed description of the drawings given below, serve to explain the principals of this invention.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 1-4 show various embodiments of the system 2 and methods 20, 50 for sensing and managing pothole location and pothole characteristics of the present invention. The system 2 may be used to acquire pothole identification data from a plurality of data sources, filter and fuse data, analyze data, and interface with a user. User-defined reports of pothole location and pothole characteristics may be generated for use by the user and/or a subscriber.

Figure 1A:
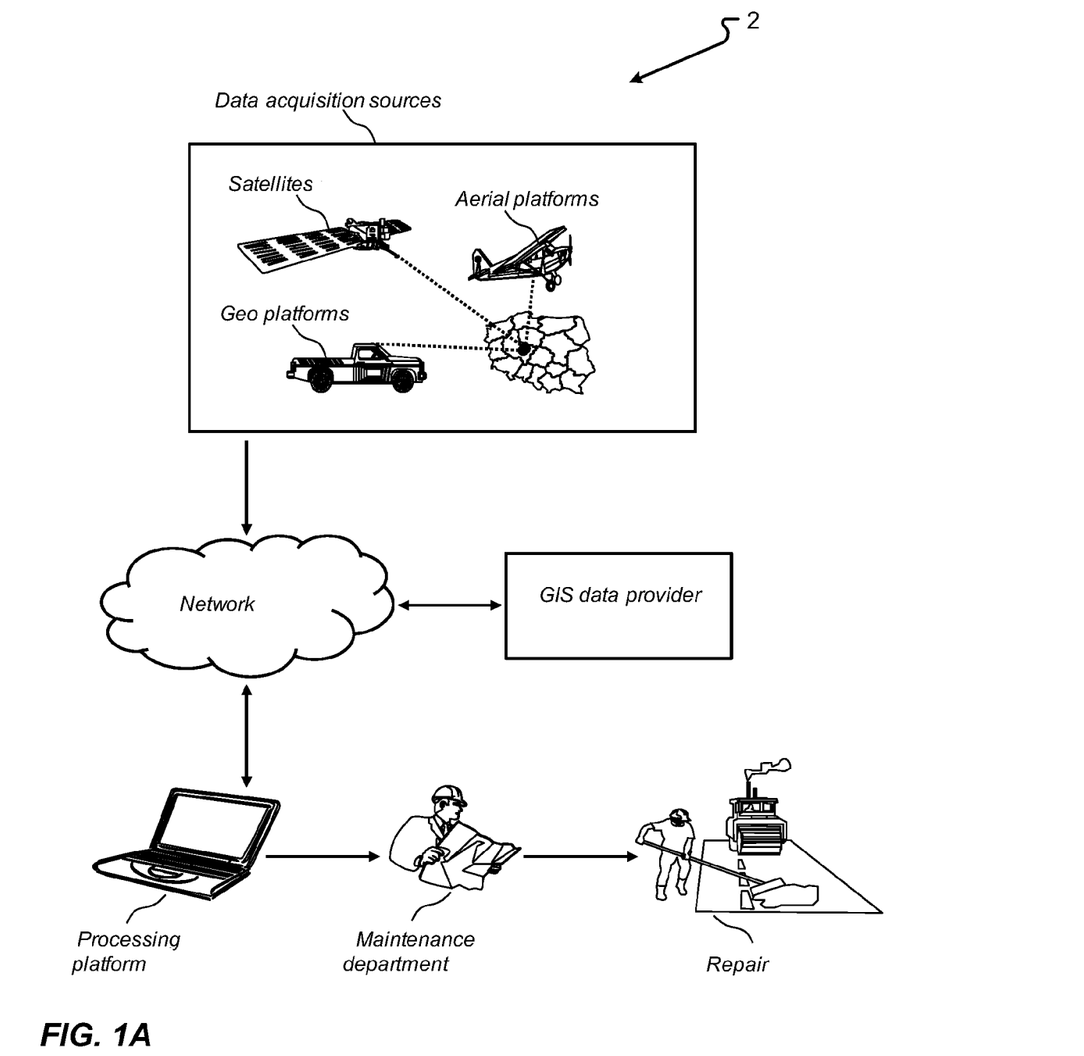
FIG. 1A is a pictorial representation of components of a system for sensing and managing pothole location and pothole characteristics in one embodiment of the system.

Referring to FIG. 1A, a pictorial representation of components of a system 2 for sensing and managing pothole location and pothole characteristics in one embodiment of the system is provided. Generally, one or more data acquisition sources provide pothole identification, such as pothole location and characteristics such as depth and severity. These data acquisition system may comprise satellite systems, aerial platforms such as aircraft, and geo platforms such as municipal vehicles. These data are then transferred to a network and combined with other data such as geospatial point data provided by one or more geographic information system (GIS) data providers. These combined data are then provided to a processing platform for user-selectable data analysis and production. The user may generate reports for use by the maintenance department of a municipality, e.g. for use by the road maintenance group of a city's public works department. In turn, such reports, identifying, for example, highest severity potholes, could then be used to generate specific work orders for repair by a road crew.

Figure 1B:
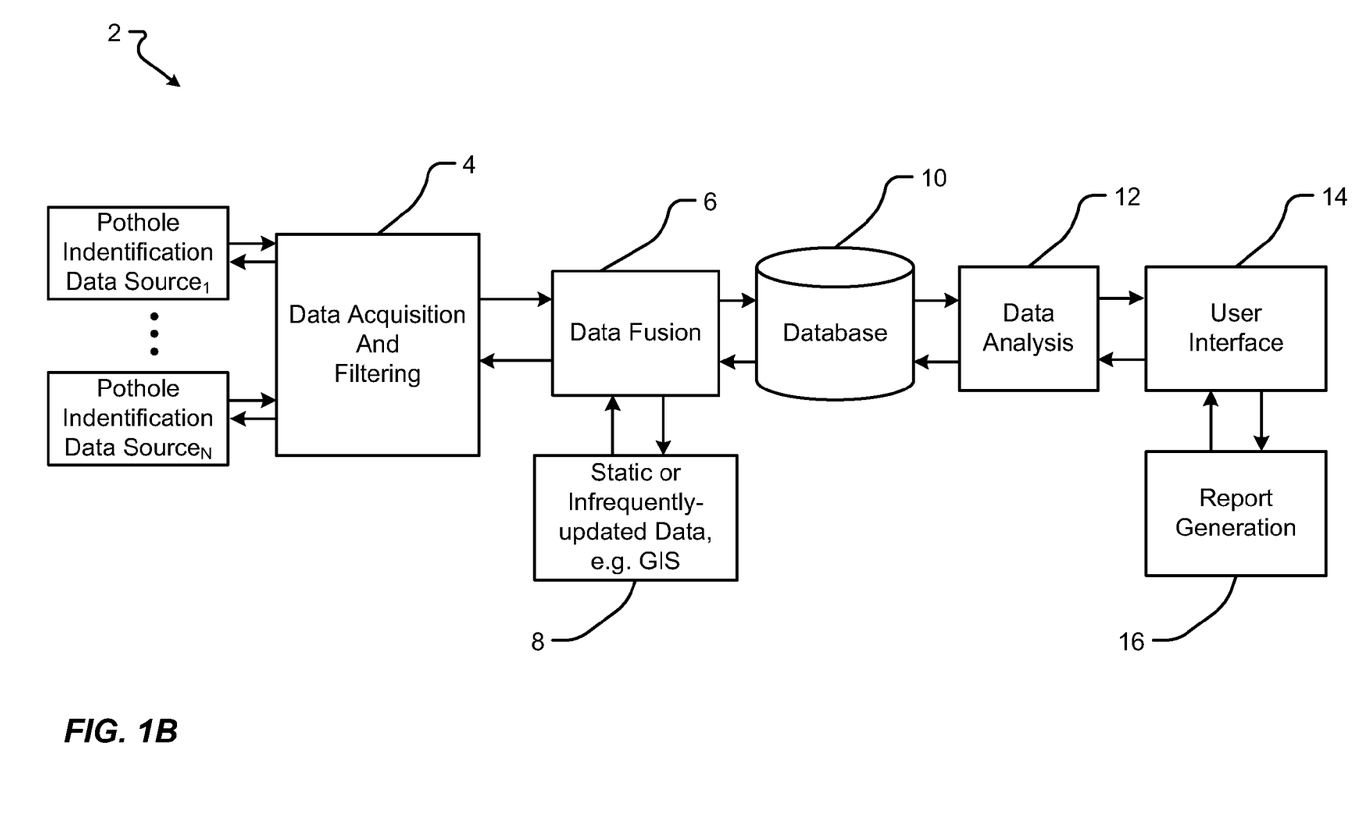
FIG. 1B is a schematic diagram of components of a system for sensing and managing pothole location and pothole characteristics in one embodiment of the system.

Referring to FIG. 1B, a schematic diagram of the components of a system 2 for sensing and managing pothole location and pothole characteristics in one embodiment of the system is depicted. The system 2 can include more or fewer components or can be arranged in a different sequence than those shown in FIG. 1B. The system 2 can be executed as a set of computer-executable instructions executed by a computer system and encoded or stored on a computer readable medium. Hereinafter, the system 2 shall be explained with reference to the systems, components, modules, software, data structures, user interfaces, etc. described in conjunction with FIGS. 1-4.

Generally, the system 2 may be used to acquire pothole identification data from a plurality of data sources, filter and fuse data, analyze data, and interface with a user. The Data Acquisition and Filtering module 4 accepts data from one or more data sources which may be specifically prompted for providing data. These pothole identification data may include location information and pothole characterization data such as width, two-dimensional or three-dimensional shape, contours, and depth profile. The data may be provided in any format known to those skilled in the art, to include latitude/longitude coordinates, measures relative to a known or provided datum associated with specialized maps such as those provided by a local municipality, coordinates relative to U.S. government maps such as Digital Terrain Elevation Maps, commercial maps such as those provided by Google Earth™ and GeoEye™, and data provided by qualitative field reports to include specified distance from street intersections. The data source may include any of several types known to those skilled in the art, to include local field reports gathered by individuals, data gathered through automated means, and data gathered remotely. For example, data sources may include ground-based platforms (a.k.a. "geo platforms"), satellites, and aerial platforms such as airplanes, helicopters, and unmanned aerial vehicles to include remotely-operated or autonomous drones. Active and passive sensing are broad categories of basic sensing forms. Passive sensing uses natural emissions of the observed object to detect characteristics of an object. Photography and thermal imaging are common passive remote sensing techniques. Active sensing requires an energy source directed at the observed object. Radar is an active sensing technique used in applications such as weather forecasting, traffic enforcement, and aircraft tracking There are other frequently used active sensing techniques, such as synthetic aperture radar (SAR) and light detection and ranging (LIDAR). Actively-sensed data can be obtained using these techniques from a satellite platform, an aerial platform, or a geo platform (ground vehicle).

Satellite data sources include optical satellites, radar satellites or other artificial satellites in earth orbit that can provide either passive or active data. Passive data further includes photographic data and other types of passive satellite data that are well known to those skilled in the art. Much of these data are readily available from the United States Geological Survey (USGS) and National Aeronautics and Space Administration (NASA) earth observation satellites via publically-available websites. The photographic data provides location information and includes digital data that contains information for each pixel that can be used in many types of processing. Radar is an example of active data obtained from a satellite that provides pothole dimensional data, and may also provide location data. Depending on the resolution required, synthetic aperture radar (SAR) may also be used. The data collected from radar satellites is spectral data that is a function of the source frequency. The higher the source frequency, the greater the resolution as provided by the appropriate antenna. SAR collects data from a single physical antenna element and gathers signals at different positions at different times. SAR is configured such that the antenna size allows for higher frequency source signals. SAR systems resolutions are about 10 cm, ultra-wideband resolutions are a few millimeters, and experimental terahertz SAR has sub-millimeter resolution in the laboratory. The higher resolution data can provide more accurate pothole dimensional data. Pothole location is obtained from global position system (GPS) satellite data. In practice GPS data is overlaid onto the SAR data (by a GIS data provider) in the geospatial point data to provide both object location and dimensional data of the object.

Aerial platform data sources include airborne platforms, such as airplanes or unmanned remotely piloted vehicles, fitted with sensors, such as cameras, radar and GPS. Photographic or radar data from aerial platforms is much the same as satellite data from satellites, except that photographic or radar data from aerial platforms can be more narrowly targeted both spatially and temporally. This provides the ability to revisit specific areas of concern without being schedule driven.

Ground-based data sources, also known as geo platforms, include trucks fitted with sensors, such as cameras, radar and GPS, that collect passive and active data. This is the least remote of any of the sensing platforms. Alterations made to radar systems for this platform allow for ground penetration data (e.g., material thickness, density, reinforcement location, and subsurface irregularities) to be acquired.

The roadway anomaly data provided by various data sources may also include, but not be limited to, timing of prior repair, type of repair (e.g. if a patch rather than a repair), repair conditions (e.g. wet roadway, high humidity conditions, "cold" patch prepared remotely or on-site), frequency of prior repair, type of asphalt roadway, relative location of repair (e.g. on edge of roadway, within a rut, at top of roadway crown), and roadway repair and construction history. Further, the data collected may be any of that collected to assess pavement condition and/or level of distress known to those skilled in the art, to include distress type, distress quantity and distress severity. For a general overview of roadway data collection and roadway anomaly data, see pavement condition index (PCI™) standards, such as for airports ASTM standard (D5340-10) for airports and ASTM standard (D6433-09) for roads and parking lots, each of which are incorporated herein by reference in their entirety.

In one aspect, some roadway anomaly data is generated from an in-situ sensor placed within or adjacent a roadway anomaly, such as within a repaired pothole, or with a roadway portion which is in a normal condition without anomalies. After placement, the in-situ sensor is calibrated with respect to initial condition, to include, for example, position, orientation, temperature and pressure. A change in any of these initial condition readings may be used to assess the roadway condition and identify any new and/or returning roadway anomalies. For example, a sensor which translates in a vertical direction beyond a selectable threshold may indicate that a pothole has formed or has returned. Similarly, an increase in recorded pressure beyond a selectable threshold may indicate adjacent roadway compression such as caused by a nearby rut.

In addition to the above data acquisition function, the Data Acquisition and Filtering module 4 also performs filtering of acquired data. For example, the Data Acquisition and Filtering module 4 may remove and/or mark clearly erroneous data, i.e. wild-point data, provided by a particular data source.

Data Fusion module 6 accepts and merges, combines, and/or fuses data from the Data Acquisition and Filtering module 4 and the Static or Infrequently-updated Data module 8. In contrast to the data accepted by the Data Acquisition and Filtering module 4 and provided to the Data Fusion module 6, the data provided by the Static or Infrequently-updated Data module 8 is typically not on-demand data which may be prompted or requested. Instead, the data of the Static or Infrequently-updated Data module 8 is fixed and/or the data source may not be queried or prompted for direct data collection. For example, these data may be geospatial point data, such as that provided by a government or commercially available GIS data provider. For example, the United States Geological Survey (USGS), National Aeronautics and Space Administration (NASA), or Defense Mapping Agency (DMA). Some of these data are provided free via internet sites. Other data sources, for example, from commercial GIS sources (e.g. GeoEye™) require a service fee. Geospatial point data is a digital data representation of the physical characteristics of a geographic point in three dimensions that is contingent on the collection source. Geospatial point data may be from a variety of different sources and may include dimensional, spectral or location information, and may additionally include information regarding a change in dimensional or spectral information, as known to those skilled in the art. As a result, geospatial point data can be used to determine length, width, and depth of earth surface features. These data are collected on a continuous yet periodic basis (e.g., a data refresh every two weeks), and consecutive data samples are communicated from GIS data collection servers of data acquisition sources.

Similar to the data provided to the Data Acquisition and Filtering module 4, the data provided by the Static or Infrequently-updated Data module 8 may include location information and pothole characterization data such as width, two-dimensional or three-dimensional shape, contours, and depth profile. The data may be provided in any format known to those skilled in the art, to include latitude/longitude coordinates, measures relative to a known or provided datum associated with specialized maps such as those provided by a local municipality, coordinates relative to U.S. government maps such as Digital Terrain Elevation Maps, commercial maps such as those provided by GoogleEarth™ and GeoEye™, and data provided by qualitative field reports such as specified distance from street intersections.

The Data Fusion module 6 may use any of several methods of combining, merging, processing, modeling and/or estimating the location and/or characteristics of a particular pothole based on the data provided by the Data Acquisition and Filtering module 4 and the Static or Infrequently-updated Data module 8. For example, the Data Fusion module 6 may employ techniques and algorithms of any variety of state estimation and signal processing known to those skilled in the art, to include deterministic methods in which no randomness is involved in creating or predicting states of a system, non-deterministic methods in which randomness is involved in creating or predicting states of a system, such as stochastic signal processing and state estimation methods, and adaptive state estimation and control in which algorithms must adapt to variable or uncertain state parameters.

The Data Fusion module 6 outputs the results of its combined, merged, processed and/or estimated location and/or characteristics of a particular pothole or collection of potholes to database 10. Database 10 may be any type of database known to those skilled in the art, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The Data Analysis module 12, in coordination with the User Interface module 14, analyzes pothole identification and characteristic data as stored in Database 10. For example, the user may query system 2 to identify potholes fitting into defined depth categories. That is, pothole severity may be defined to fall in one of three depth categories. A pothole defines a three-dimensional object void of width and length. A user may specify these three categories of pothole with respect to depth and may specify a minimum dimension of either depth or width to trigger consideration as a valid or identified pothole (for example, 6 inches). A category I pothole may be a valid pothole less than 1 inch deep, a category II between 1 and 2 inches in depth, and a category III of depth greater than 2 inches. These three categories may also be termed of low, moderate, and high severity, respectfully. Among other analyses, the Data Analysis module 12 may assess trends among a plurality of potholes in a user-specified region, for example, along a stretch of road between two major intersections, or compare different asphalt road construction techniques to access which are more prone to pothole generation. The Data Analysis module 12 may also compare previous or other repairs for a given pothole, or across multiple potholes, to determine trends and modifications to the repair sequences and/or materials. Further, the Data Analysis module 12 may determine scheduling for pothole repairs based on, for example, roadway history of repair. The user may also request analysis of only certain types of roadways, that is, combinations of arterial roadways or collector roadways. Furthermore, the Data Analysis module 12 may correlate maintenance funds expended versus pothole severity and/or frequency on a particular roadway. Also, the Data Analysis module 12 may determine one or more preferred methods of repair for a given roadway anomaly, and then provide such information to a roadway repair machine, such as those described in U.S. patent application Ser. Nos. 12/651,358 and 13/167,888 cited above.

The User Interface module 14 enables one or more users to engage the system 2 and direct queries. For example, user queries may include queries to the Data Analysis module 12, setting of analysis thresholds for the Data Analysis module 12 and/or the Data Acquisition and Filtering module 4, directing which data sources to employ to output to the Data Acquisition and Filtering module 4 and/or to the Static or Infrequently-updated Data module 8, and the format of any output of the system 2 such as a report to be created by the Report Generation module 16. By way of further example, the user may request, through the User Interface module 14, that only ground-based data sources for pothole identification are used as inputs to the Data Acquisition and Filtering module 4. Such a constraint may issue when a municipal government has expended most roadway maintenance funds for a given fiscal year and cannot afford the typically higher cost of satellite and/or airborne data sources.

The User Interface module 14 may comprise a display. The term "display" refers to a portion of one or more screens used to display the output of a computer to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen. A display may have the capability to record and/or print display presentations and display content, such as reports.

The user interface may be by any of several means known to those skilled in the art. As an example of user interfaces and features thereof, U.S. Pat. No. 5,950,169 issued to Borghesi et al. on Sep. 7, 1999 ("Borghesi") is cited. Borghesi teaches a system and method for managing and processing insurance claims that implements an object oriented graphic user interface. The system includes at least one remote computer for entering and viewing insurance claim information. A wide area network capable of communicating with the remote computer and a computer in communication with said wide area network are also included. A graphic user interface for use in managing an insurance claim from an initial claim to final settlement is also included. The interface has common workflow objects such as an in box, an in process box, and an out box, for managing and manipulating one or more workfiles. Borghesi is incorporated herein by reference in its entirety.

The Report Generation module 16 may be of any format and type known to those skilled in the art. For example, the report may be a print-out of pothole location, severity, analysis date, pothole identification sources, and suggested repair method. Furthermore, the report may be delivered by any means known to those skilled in the art, to include land mail, electronic-mail and file transfer protocols (FTP), web-site and fax. Recipients of the output from the Report Generation module 16 include maintenance departments and road crews using road repair and paving equipment that act upon maintenance reports by carrying out road repairs.

Figure 2:
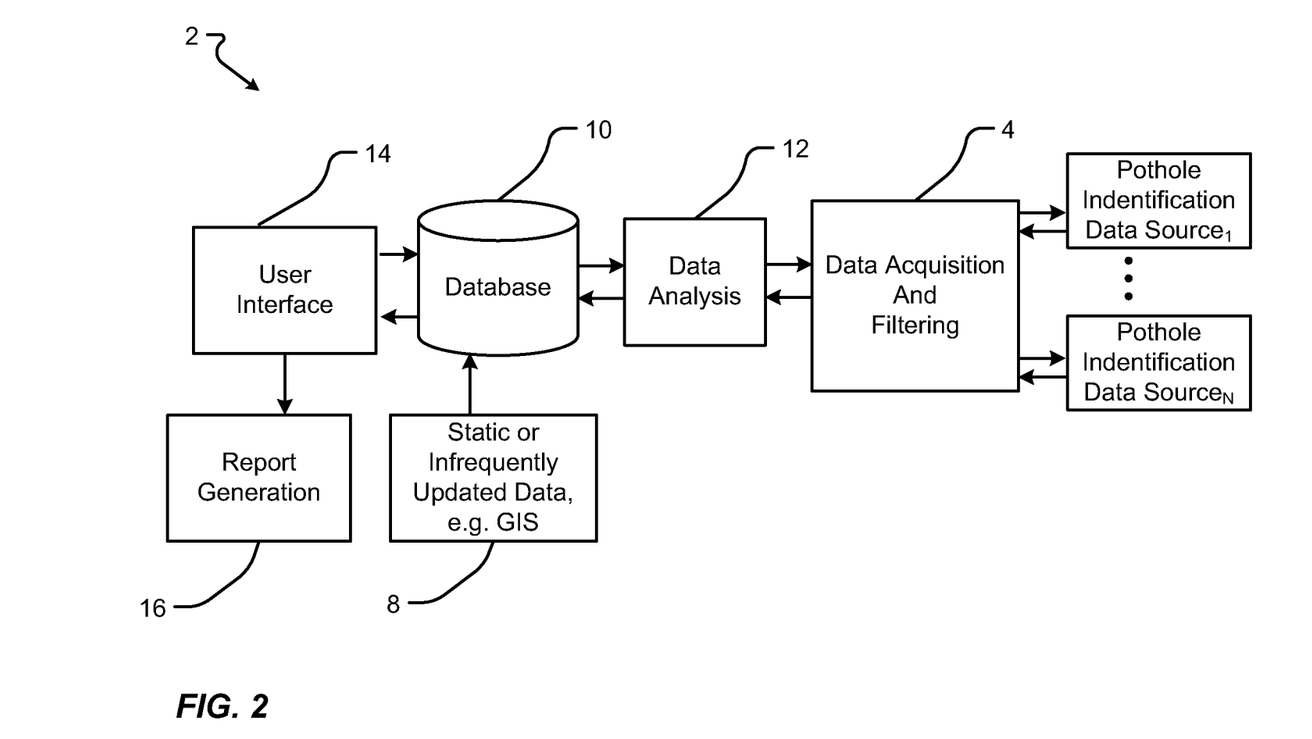
FIG. 2 is a schematic diagram of components of a system for sensing and managing pothole location and pothole characteristics in an alternate embodiment of the system.
Figure 3:
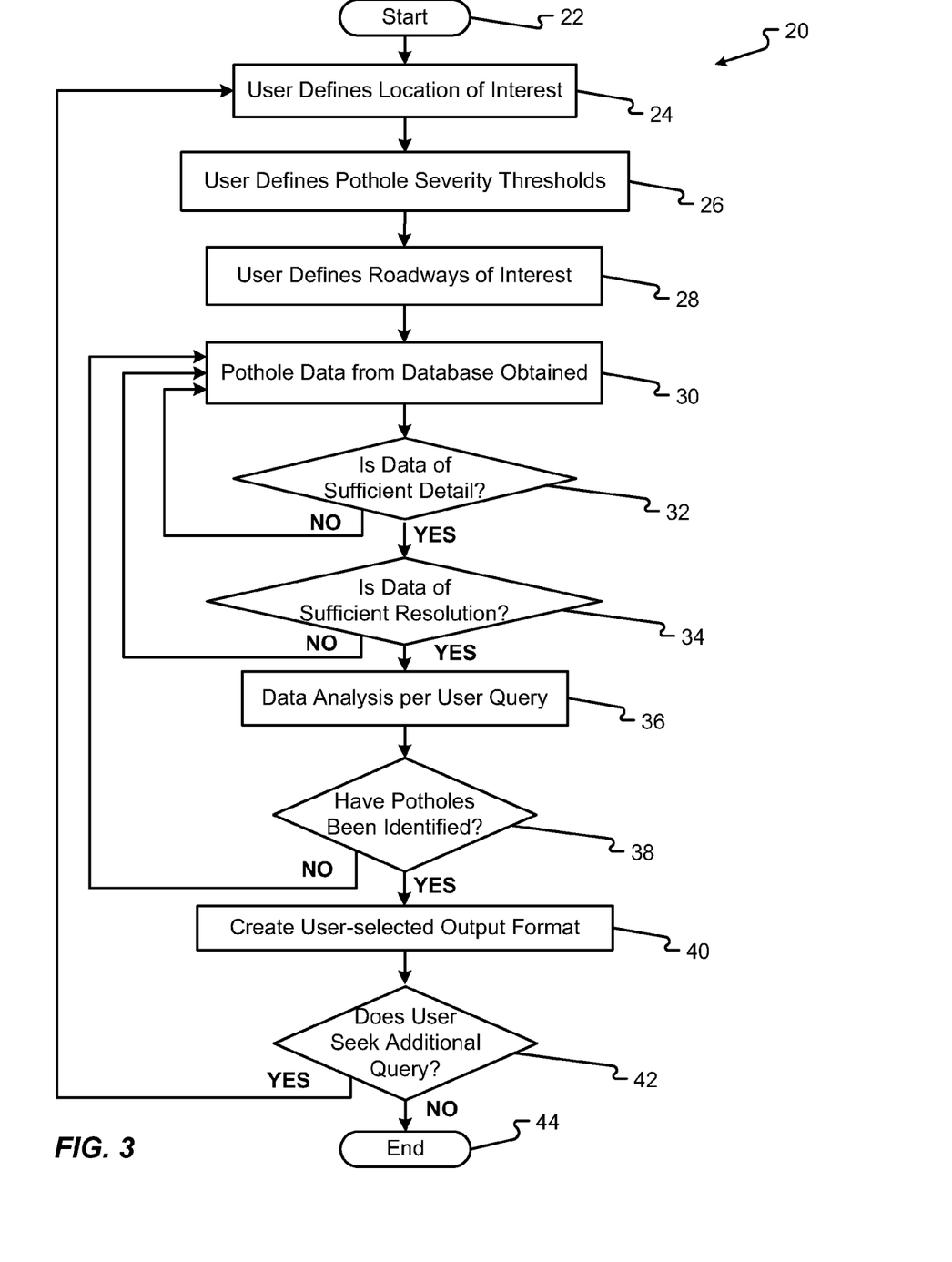
FIG. 3 is a flow diagram of an embodiment of a method for creating a report of pothole location and pothole characteristics.

Referring to FIG. 2, a schematic diagram of the components of a system for sensing and managing pothole location and pothole characteristics in an alternate embodiment of the system 2 is depicted. The embodiment of FIG. 2 is complimentary to the embodiment of FIG. 1B and uses similarly functioning elements as those of FIG. 1B, but is depicted in a more user-centric manner and emphasizes a user assembling and analyzing data toward generating a report. An embodiment of a method 20 for creating a report of pothole location and pothole characteristics is shown in FIG. 3. As such, FIGS. 2 and 3 will be described together.

The system 2 can include more or fewer components or can be arranged in a different sequence than those shown in FIG. 2. The system 2 can be executed as a set of computer-executable instructions executed by a computer system and encoded or stored on a computer readable medium.

The User Interface module 14 enables one or more users to engage the system 2. The user interface 14 may function to enable queries to the Database 10 and Report Generation 16. For example, the user may query database 10 to determine the history of pothole identifications and/or pothole repairs for a given roadway. The user may then compile that data and print a report for use by a road repair manager to access the quality of contractor or in-house repair of that particular roadway. By way of another example, the user may determine, through use of Data Analysis module 12 and/or from an initial query to the Database 10, that little or no pothole data has been collected for a particular roadway for too long of a time. The user may then direct the Data Acquisition and Filtering module 4 to task particular Pothole Identification Data Sources to collect such latent data.

An embodiment of a method 20 for creating a report of pothole location and pothole characteristics is shown in FIG. 3. A general order for the steps of the method 20 is shown in FIG. 3. Generally, the method 20 starts with a start operation 22 and ends with an end operation 42. The method 20 can include more or fewer steps or can be arranged in a different sequence than those shown in FIG. 3. The method 20 can be executed as a set of computer-executable instructions executed by a computer system and encoded or stored on a computer readable medium.

A user defines the geographic location of interest in step 24. That is, the geographic location of an area of interest for determining pothole severity and location is defined. This area of interest is given by a range of coordinates, such as a range of latitude and longitude for a municipal area such as a town or a county. The user could also enter a value signifying the maximum time delay between sample geospatial point data. The user may be staff from a maintenance department of a public works department.

In step 26 the user defines pothole severity thresholds. A pothole needing repair is defined according to specific parameters, including pothole dimensions and growth rate. In this step, the user, such as maintenance department personnel, enter values for specific parameters of pothole severity. Parameters include minimum depth and minimum planar dimensions, using a classification system, such as the one provided in the Department of Transportation National Highway Administration (DOT NHWA) Distress Identification Manual. In addition, the minimum pothole growth rate observed between samples of geospatial point data is also entered. The occurrence of fixing the same pothole may also be entered. Furthermore, successive tiers of pothole growth rates may also be provided, where increasing growth rates are indicative of increased severity of potholes.

In step 28, the user defines roadways of interest for determining pothole severity and location. In this step, the user defines the specific roadways of interest by entering roadway identification designations, such as street names or highway numbers. The user could also categorize roadways by type, for example as highway, arterial, collector, and local.

Pothole data for the particular location of interest identified in step 24 is obtained from the database in step 30. This data may be from one or more sources, comprising geospatial point data from a GIS data provider for specific roadways identified in step 28 in the geographical region defined in step 24, and data from other pothole identification data sources as discussed above. These data sources are then assessed for sufficient detail in step 32 and for sufficient resolution in step 34. As a number of data acquisition sources are available for use by a GIS data provider, the resulting resolution, quality, and completeness of data provided by data acquisition sources may vary, depending on the source, e.g. from satellites, aerial platforms, or geo platforms. The source of active data used to create geospatial point data may be programmatically selected by the user according to any of several criterion. For example, the user may require that ordinarily satellites are the default source of active data for geospatial point data, while other sources of active data, e.g. aerial platforms or geo platforms, are programmatically selectable depending on the outcomes of the conditional steps in the remainder of method 20.

At step 32, a query is made to determine if the data is of sufficient detail. That is, the data is assessed to determine if the data received provides adequate coverage for the area of interest, and whether the data received is of adequate quality for pothole detection. If the data is determined to be of sufficient detail then the method enters step 34. If the data is determined to not be of sufficient detail, the method enters step 32 to seek other and/or additional data from the database.

At step 34, a query is made to determine if the data is of sufficient resolution. That is, the data is assessed to determine if the resolution is sufficient to detect potholes. The pothole severity criteria of step 26 is compared with the resolution of the geospatial point data in the area of interest to determine if the data is compatible with the pothole physical characteristics; i.e., the resolution is within the dimensions of a pothole. For example, if it is determined that data from satellites (e.g., radar data) lacks sufficient resolution in the area of interest, the method will select a different source of data for the next geospatial point data sample, such as from aerial platforms or geo platforms. If the data is determined to be of sufficient resolution then the method enters step 36. If the data is determined to not be of sufficient resolution, the method enters step 32 to seek other and/or additional data from the database.

In step 36, data analysis is performed per the user query of step 24. The data analysis may comprise creating a time-ordered record of geospatial point data. Also, valid geospatial point data may be time stamped and stored. This time-stamped geospatial point data is added to any preceding data to create a time-ordered record of geospatial point data that can be used to track changes in the roadway condition in the area of interest.

In step 38, a query is made to determine if potholes have been identified. First, potential potholes are identified and stored in a time-ordered data record and a comparison is made between the length, width, and depth of geospatial point data to determine if the length, width, and depth of a void in a roadway is within the user-selected definition of a pothole (as established in step 26), thereby identifying the presence of a potential pothole needing maintenance. Resolution of the geospatial point data from step 34, such as the pixel size corresponding to a square area, is used to determine dimensional conformity to pothole dimensions. The resolution required (e.g. pixel size, 8 to 14 bit radiometric or sampling frequency) is predicated on the data collection method, be it radar, photographic, or any other means, as well known to those skilled in the art. Potential potholes identified in step 38 are given an identification number and stored, along with corresponding length, width, and depth data, and the time stamp of the data sample, thereby creating time-ordered data record of potential potholes. If no potential pothole is identified in step 38, a timestamp is recorded with a null data set. Also in step 38, a query is made to determine if the time-ordered data record of potential potholes contains the minimum data to detect a pothole. That is, it is determined if the data record of potential potholes contains more than one data record for at least one potential pothole, or if the predefined maximum time delay between samples geospatial point data has been exceeded. If the predefined time delay has been exceeded, the method returns to step 30. If the predefined time delay has not been exceeded, then successive time-ordered potential potholes are compared. Any temporal change or lack of temporal change will then be recorded; i.e., if the potential pothole grows on a successive sample, it is positively identified as a pothole. The rate of growth of the potential potholes is then compared to the successive tiers of pothole growth rates defined is step 26 to determine the severity of the pothole. Potholes so identified are given an identification number and stored along with the corresponding length, width, and depth data, severity tier and time stamp of the data sample, thereby creating time-ordered data record of potholes.

In step 40, the user creates their output format for the report of pothole location and pothole characteristics. For example, the report may organize potholes by ward or precinct, by severity or by traffic volume. The report may be formatted for use by a maintenance department and/or as a work order for a roadway repair crew. The report could also be presented in a visual display to the user, for example through a graphical user interface (GUI) map utilizing some or all of the data of the previous steps. As another example, a map may be used to depict the location of potholes, potential potholes and other roadway details in a graphical fashion for the municipal report as a graphical aid for a maintenance department. Other information that may be displayed includes pothole severity and dimensions, and geographic and municipal features. The user could also select the deliver means, for example by email, by posting to a website or by physical print-out and mailing.

In step 42, a query is made to ask if the user seeks any additional analysis or reports of pothole location and pothole characteristics. If yes, the method enters step 24. If no additional analyzes or reports are sought by the user, the method ends at step 44.

The method 20 may also comprise a step in which a delay is placed before pothole data from the data base is obtained, that is a delay before step 30 is entered. The time delay is less than or equal to the maximum time delay defined in step 24.

Figure 4:
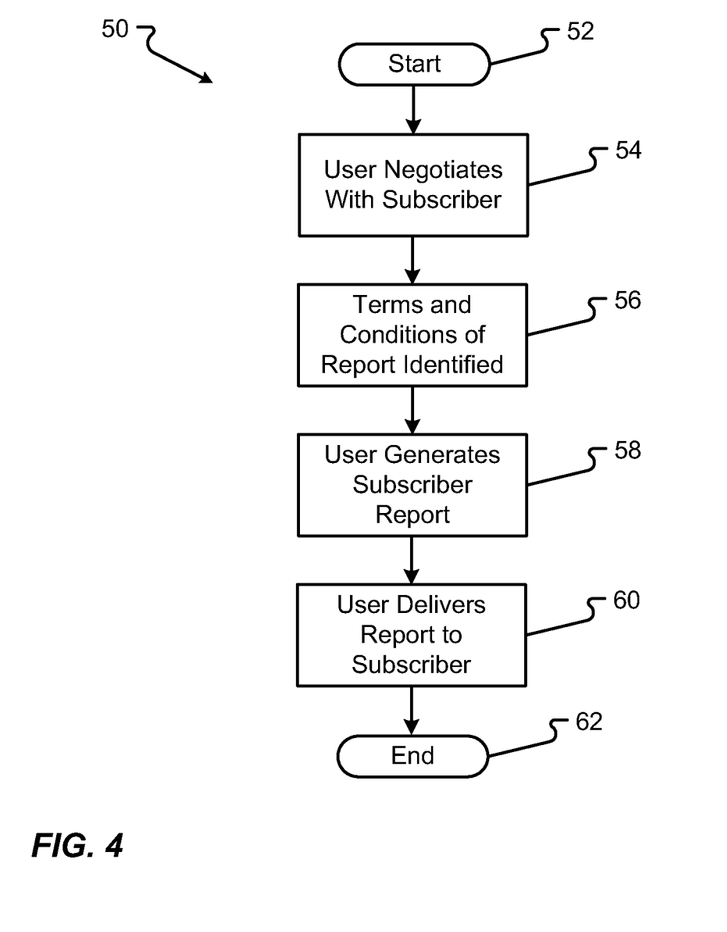
FIG. 4 is a flow diagram of an embodiment of a method for creating and delivering a subscriber report of pothole location and pothole characteristics.

An embodiment of a method 50 for creating and delivering a subscriber report of pothole location and pothole characteristics is shown in FIG. 4. A general order for the steps of the method 50 is shown in FIG. 4. Generally, the method 50 starts with a start operation 52 and ends with an end operation 62. The method 50 can include more or fewer steps or can be arranged in a different sequence than those shown in FIG. 4. The method 50 can be executed as a set of computer-executable instructions executed by a computer system and encoded or stored on a computer readable medium. Hereinafter, the method 50 shall be explained with reference to the systems, components, modules, software, data structures, user interfaces, etc. described in conjunction with FIGS. 1-4.

A user negotiates with a subscriber in step 54. Here, the user listens to potential subscribing customer needs and requirements, and describes the services available and the fees associated with each service. For example, the potential subscriber may seek a service that identifies and characterizes potholes only over principal or arterial roadways, and that will use, as one of the data sources, the city's own existing pothole database and identification system. This situation might exist when a city already has invested in a roadway maintenance and repair database system or has a reporting system in place for its public works employees to identify potholes.

Terms and conditions of a subscriber report are identified in step 56. In addition to defining the exact services and features the user will supply to the subscriber at defined prices, the means of reporting are established. The report may be delivered by any means known to those skilled in the art. For example, the report may be delivered as an internet-based website subscription, with, for example, user accounts to allow private, password protected data access for a fee. Alternatively, a written report may be provided (e.g., a paper report) that contains the same information available on the website.

The user generates the subscriber report in step 58. The report is as-agreed in step 58. The report may be of several subscribing customer formats, such as a municipal report that contains the results, location, and severity of potholes.

In step 60, the user delivers the report to the subscriber. For example, as discussed above in step 56, the report may be delivered in any of several means, to include an internet-based website subscription and a paper report. The method 50 ends with step 62.

Communications means and protocols may include any known to those skilled in the art, to include cellular telephony, internet and other data network means such as satellite communications and local area networks. As examples, the cellular telephony can comprise a GSM, CDMA, FDMA and/or analog cellular telephony transceiver capable of supporting voice, multimedia and/or data transfers over a cellular network. Alternatively or in addition, other wireless communications means may comprise a Wi-Fi, BLUETOOTH™, WiMax, infrared, or other wireless communications link. Cellular telephony and the other wireless communications can each be associated with a shared or a dedicated antenna. Data input/output and associated ports may be included to support communications over wired networks or links, for example with other communication devices, server devices, and/or peripheral devices. Examples of input/output means include an Ethernet port, a Universal Serial Bus (USB) port, Institute of Electrical and Electronics Engineers (IEEE) 1394, or other interface. Communications between various components can be carried by one or more buses.

Computer processing may include any known to those skilled in the art, to include desktop personal computers, laptops, mainframe computers, mobile devices and other computational devices.

The software management architecture and means may be of any of several means known to those skilled in the art. For example, U.S. Pat. Pub. No. 2009/0030910 published to Bennett et al. on Jan. 29, 2009 ("Bennett") teaches a relational database system and method for electronically storing and managing data, documents, and files relating to individuals, properties, vehicles, pets, assets and corporate bodies to facilitate easy viewing, retrieval, organization and onward transmission of such information. The Bennett system enables a user to enter information into an intuitive relational database system on a once-only basis. Further, Bennett integrates on a user selectable two-way basis with third party suppliers, agencies, and computer programs. The system and method allow for centralized storage and then automated communication of a user's information for the purposes of receiving notifications of the lowest service provider quotes as well as sending notifications of emergency response, moving information, address updates, disaster recovery, and the like, from a single relational database system. Acceptance of such quotes may be automatic, and relevant documentation may thereafter be uploaded to the user's account for later search and review. Bennett is incorporated herein by reference in its entirety.

What is claimed is:

1. A system for monitoring and identifying road damage, comprising:

a data acquisition module configured to receive and request data from one or more data sources, the one or more data sources providing at least a location of one or more roadway anomalies, the one or more roadway anomalies comprising a pothole;

a database configured to receive data from the data acquisition module and to store the one or more roadway anomalies with respect to a roadway map, the database further configured to store previous roadway anomaly data;

a user interface configured to receive a user query involving one or more roadway anomalies with respect to the roadway map, the user interface in communication with at least one of the data acquisition module and a data analysis module;

the data analysis module in communication with the database, the data analysis module configured to receive and to respond to the user query;

a report generation module configured to create a report with respect to the user query;

wherein the data analysis module is configured to analyze the previous roadway anomaly data with respect to the user query; and wherein the data analysis module creates a recommended schedule of roadway repair with respect to the one or more roadway anomalies;

wherein the previous roadway anomaly data comprises timing of any prior repair of the one or more roadway anomalies and an identification of a type of any previous repair of the one or more roadway anomalies.

2. The system of claim 1, further comprising a data fusion module, the data fusion module adapted to receive data from the data acquisition module, the data at least comprising a location of the one or more roadway anomalies.

3. The system of claim 1, further comprising a geographic information system module.

4. The system of claim 3, wherein the geographic information system at least comprises one or more roadway maps.

5. The system of claim 1, wherein the previous roadway anomaly data includes at least i) a type of repair comprising patch repair, and ii) an asphalt roadway type.

6. The system of claim 1, wherein the one or more data sources also provide at least three other characteristics comprising: a pothole dimension, a pothole severity, a history of previous pothole repair, a pothole repair material, and an identification of a process used to previously repair the pothole.

7. The system of claim 1, wherein the user query is with respect to a correlation between the one or more roadway anomalies and the roadway map.

8. The system of claim 1, wherein the one or more data sources comprise at least one of a satellite, an aircraft, a human, and a vehicular data source.

9. A method of identifying one or more potholes and formulating a repair schedule, comprising:

receiving data from one or more data sources, the one or more data sources providing at least a location of the one or more potholes;

receiving roadway map data from a geographic information system;

receiving a user query involving the one or more potholes with respect to the roadway map;

correlating the one or more potholes with respect to the roadway map to at least locate the one or more potholes with respect to the roadway map and to at least analyze previous pothole data with respect to the roadway map; and creating a repair schedule for repair of the one or more potholes with respect to the roadway map;
wherein the previous pothole data comprises a date of any previous repair of the one or more potholes and an identification of a type of said any previous repair of the one or more potholes.

10. The method of claim 9, further comprising a step of generating a report with respect to the repair schedule for repair of the one or more potholes with respect to the roadway map.

11. The method of claim 9, wherein the data received from the one or more data sources is provided in a database.

12. The method of claim 9, wherein a display screen device used to display a result of a correlation of the one or more potholes with respect to the roadway map.

13. The method of claim 9, wherein a roadway of the roadway map data is comprised of asphalt material.

14. The method of claim 9, wherein the one or more data sources provides a location of a pothole and at least one other physical characteristic of the pothole.

15. The method of claim 14, wherein the at least one other physical characteristic is at least one of a pothole dimension and a history of repair.

16. The method of claim 9, wherein the one or more data sources comprise at least one of a satellite, an aircraft, a human, and a vehicular data source.

17. A system for scheduling pothole repair of asphalt roads, comprising:
a data acquisition module adapted to receive and request data from one or more data sources, the one or more data sources providing locations of a plurality of potholes;
a database adapted to receive data from the data acquisition module and to store the locations of the plurality of potholes with respect to a roadway map, the database further adapted to store previous pothole repair data;
a user interface adapted to receive a user query involving one or more of the plurality of potholes with respect to the roadway map, the user interface in communication with the data acquisition module and a data analysis module;
the data analysis module in communication with the database, the data analysis module adapted to receive and to respond to the user query;
a report generation module adapted to create a report with respect to the user query;
wherein the data analysis module is adapted to analyze the previous pothole repair data with respect to the user query; and
wherein the data analysis module creates a recommended schedule of pothole repair;
wherein the previous pothole repair data comprises a date of any previous repair of the plurality of potholes and identification of a type of said any previous repair of the plurality of potholes.

18. The system of claim 17, wherein the previous pothole repair data further includes at least i) a type of repair, and ii) an asphalt roadway type.

19. The system of claim 18, wherein the one or more data sources also provide a pothole severity, an identification of a pothole previous repair material type and an identification of a process used to previously repair the pothole.

* * * * *